(12) United States Patent
Hoffart

(10) Patent No.: US 6,431,288 B1
(45) Date of Patent: Aug. 13, 2002

(54) FRONT THREE-POINT HITCH SYSTEM

(76) Inventor: Ronald J. Hoffart, 755 2nd Ave. NW., West Fargo, ND (US) 58078

( * ) Notice: Subject to any disclaimer, the term of this patent is extended or adjusted under 35 U.S.C. 154(b) by 0 days.

(21) Appl. No.: 09/718,886

(22) Filed: Nov. 21, 2000

(51) Int. Cl.$^7$ .......................................... A01B 59/048
(52) U.S. Cl. ..................................................... 172/439
(58) Field of Search ................................ 172/439, 440, 172/443, 445, 448, 449, 677, 679, 680

(56) References Cited

U.S. PATENT DOCUMENTS

| | | | | |
|---|---|---|---|---|
| 3,571,956 A | * | 3/1971 | Heiberg | 37/98 |
| 3,657,831 A | * | 4/1972 | Kant | 37/193 |
| 3,777,823 A | * | 12/1973 | Holfeld | 172/328 |
| 5,360,070 A | * | 11/1994 | Milton | 172/6 |
| 5,394,948 A | * | 3/1995 | Bunnell | 172/677 |
| 5,975,216 A | * | 11/1999 | Gibbons | 172/439 |

* cited by examiner

Primary Examiner—Christopher J. Novosad
(74) Attorney, Agent, or Firm—Michael S. Neustel

(57) ABSTRACT

A front three-point hitch system for allowing a hood and grill of a tractor to be opened free of obstruction. The front three-point hitch system includes a pair of support plates attachable to a tractor frame, a pair of cuff members extending inwardly from the support plates about a pair of opposing apertures, a support structure pivotally attached between the pair of support plates by a pivot pin, a pair of extended tubular supports extending outwardly from the support structure about an aperture positionable within the cuff members, a main pin removably extendable through the apertures within the support plates and the support structure, a pair of support arms pivotally attached to the support structure, and a pair of hydraulic cylinders connected between the support structure and the support arms for effecting movement of the support arms with respect to the support structure.

14 Claims, 12 Drawing Sheets

FRONT THREE-POINT HITCH SYSTEM

BACKGROUND OF THE INVENTION

1. Field of the Invention

The present invention relates generally to front three-point hitches and more specifically it relates to a front three-point hitch system for allowing a hood and grill of a tractor to be opened free of obstruction.

2. Description of the Prior Art

Front three-point hitches have been in use for years. Typically, a front three-point hitch is attached to the front portion of the frame of the tractor wherein a pair of arms support an implement or other object. The main problem with conventional front three-point hitches is that when they are utilized upon tractors with a forward tilting hood, such as the CASE STX series tractor, the front three-point hitch obstructs the opening of the hood or the front grill.

While these devices may be suitable for the particular purpose to which they address, they are not as suitable for allowing a hood and grill of a tractor to be opened free of obstruction. Conventional front three-point hitches do not allow for the opening of a hood or the grill of a tractor.

In these respects, the front three-point hitch system according to the present invention substantially departs from the conventional concepts and designs of the prior art, and in so doing provides an apparatus primarily developed for the purpose of allowing a hood and grill of a tractor to be opened free of obstruction.

SUMMARY OF THE INVENTION

In view of the foregoing disadvantages inherent in the known types of front three-point hitches now present in the prior art, the present invention provides a new front three-point hitch system construction wherein the same can be utilized for allowing a hood and grill of a tractor to be opened free of obstruction.

The general purpose of the present invention, which will be described subsequently in greater detail, is to provide a new front three-point hitch system that has many of the advantages of the front three-point hitches mentioned heretofore and many novel features that result in a new front three-point hitch system which is not anticipated, rendered obvious, suggested, or even implied by any of the prior art front three-point hitches, either alone or in any combination thereof.

To attain this, the present invention generally comprises a pair of support plates attachable to a tractor frame, a pair of cuff members extending inwardly from the support plates about a pair of opposing apertures, a support structure pivotally attached between the pair of support plates by a pivot pin, a pair of extended tubular supports extending outwardly from the support structure about an aperture positionable within the cuff members, a main pin removably extendable through the apertures within the support plates and the support structure, a pair of support arms pivotally attached to the support structure, and a pair of hydraulic cylinders connected between the support structure and the support arms for effecting movement of the support arms with respect to the support structure.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a front three-point hitch system that will overcome the shortcomings of the prior art devices.

A second object is to provide a front three-point hitch system for allowing a hood and grill of a tractor to be opened free of obstruction.

Another object is to provide a front three-point hitch system that allows an individual to easily access under the hood for maintenance and examination of the tractor.

An additional object is to provide a front three-point hitch system that can be utilized upon various types of tractors.

A further object is to provide a front three-point hitch system that does not require the complete removal of a front three-point hitch to access the tractor.

Another object is to provide a front three-point hitch system that provides quick and efficient access underneath the hood of a tractor with a front three-point hitch.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
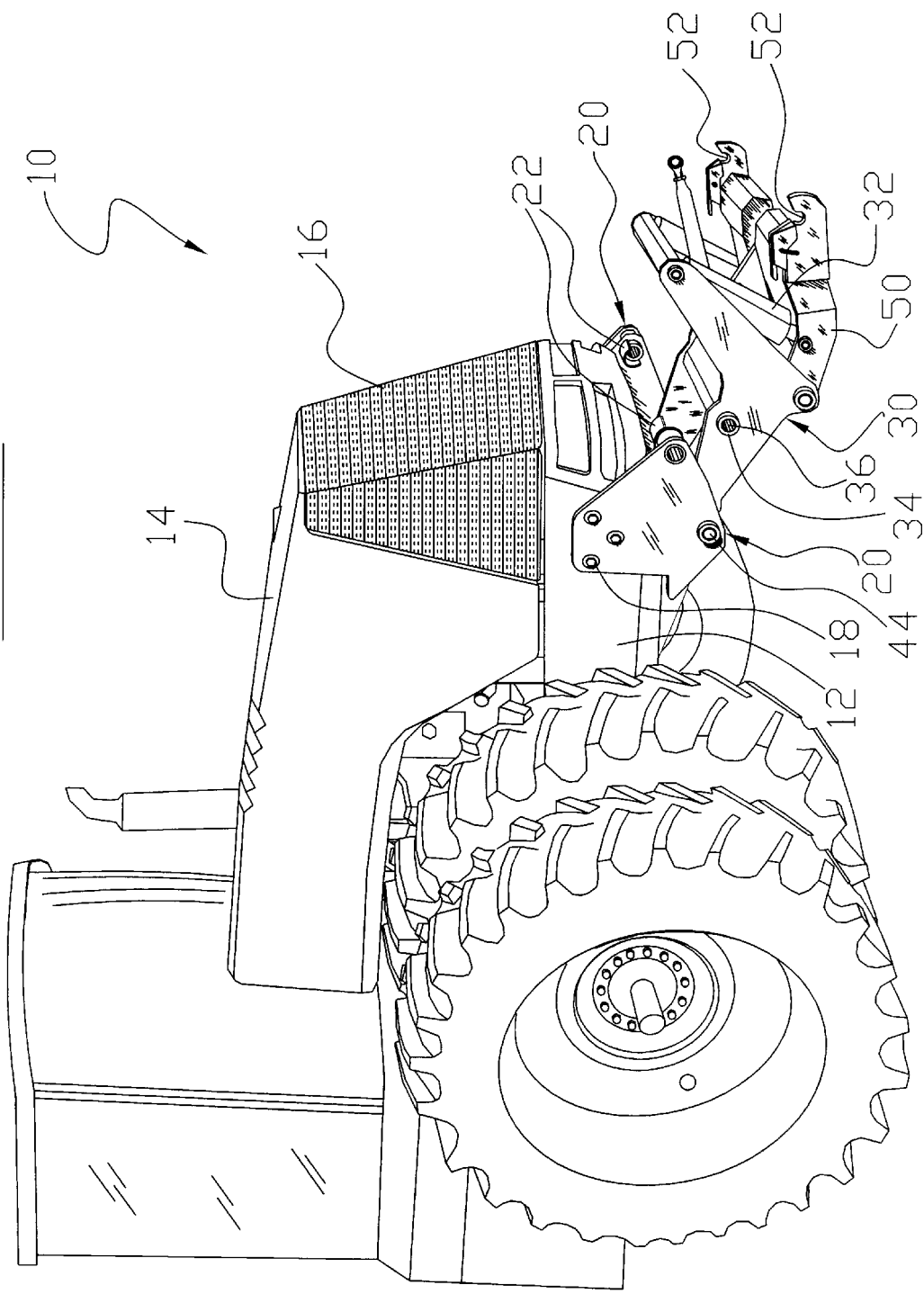
FIG. 1 is an upper perspective view of the present invention attached to a tractor with the hood and grill of the tractor closed.

Turning now descriptively to the drawings, in which similar reference characters denote similar elements throughout the several views, FIGS. 1 through 12 illustrate a front three-point hitch system 10, which comprises a pair of support plates 20 attachable to a tractor frame 12, a pair of cuff members 22 extending inwardly from the support plates 20 about a pair of opposing apertures, a support structure 30 pivotally attached between the pair of support plates 20 by a pivot pin 44, a pair of extended tubular supports 34 extending outwardly from the support structure 30 about an aperture positionable within the cuff members 22, a main pin 40 removably extendable through the apertures within the support plates 20 and the support structure 30, a pair of support arms 50 pivotally attached to the support structure 30, and a pair of hydraulic cylinders 32 connected between the support structure 30 and the support arms 50 for effecting movement of the support arms 50 with respect to the support structure 30.

Figure 2:
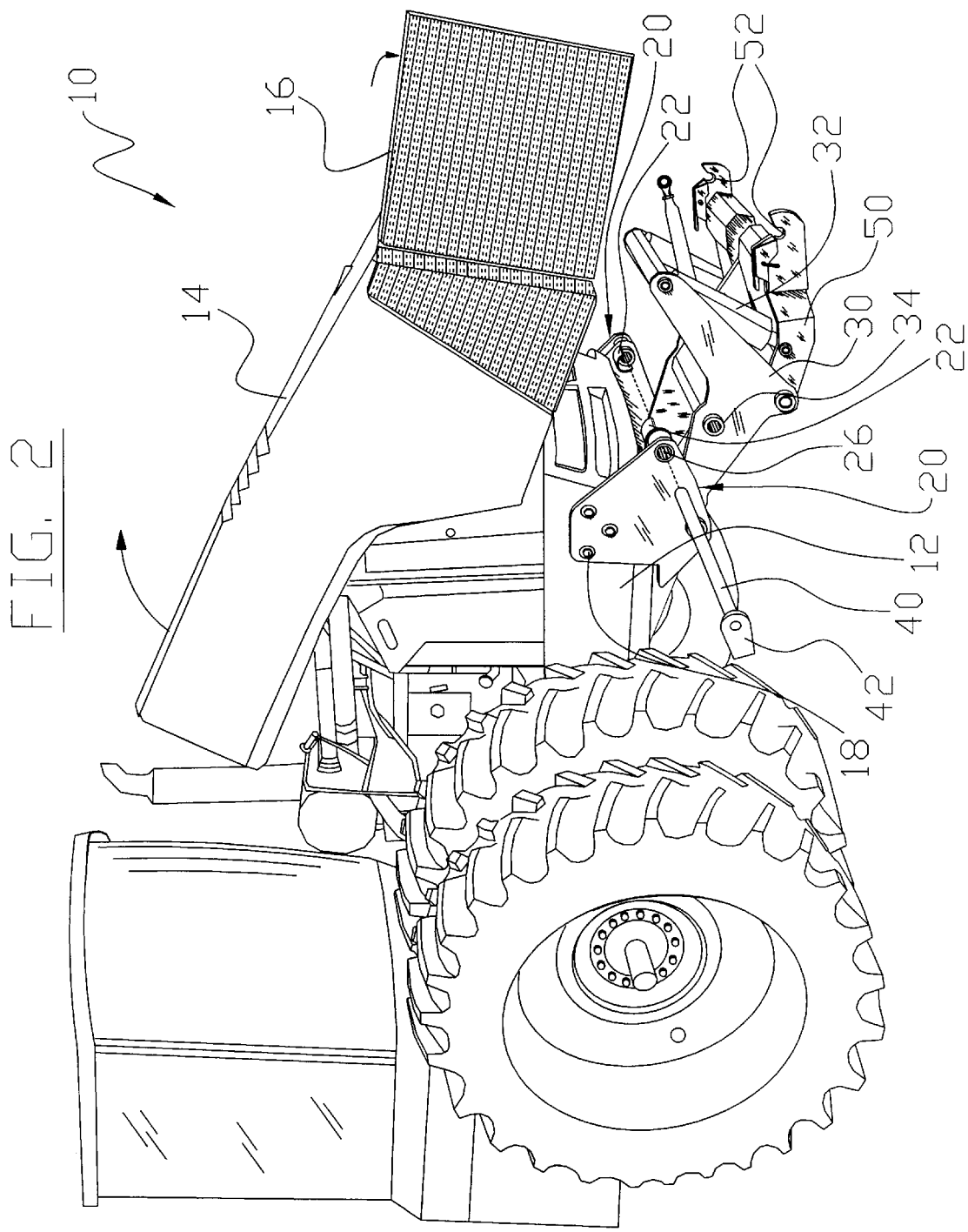
FIG. 2 is an upper perspective view of the present invention attached to a tractor with the hood and the grill open.
Figure 3:
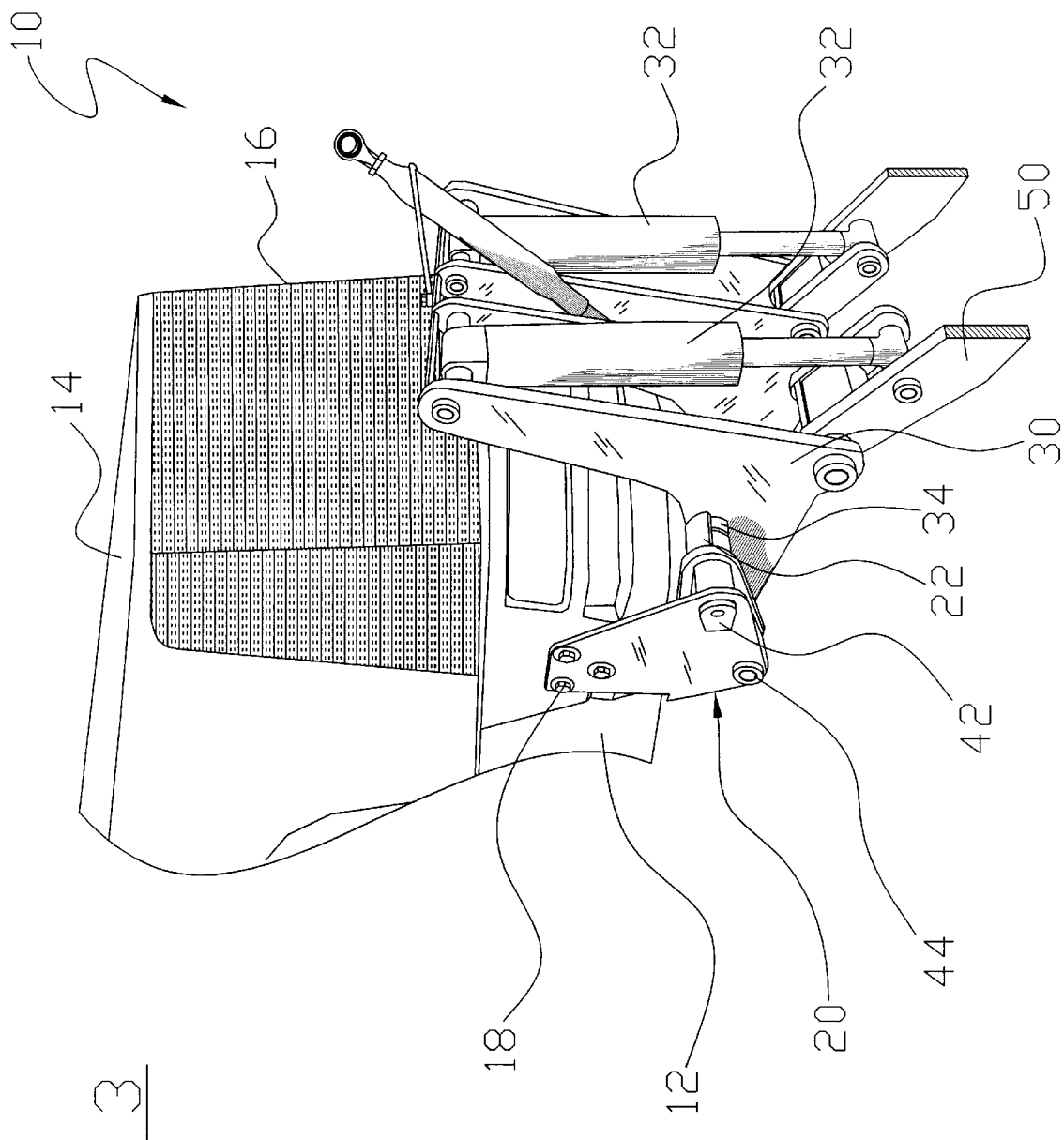
FIG. 3 is a magnified front upper perspective view of the present invention attached to the tractor with the hood closed.

As shown in FIGS. 1 through 3 of the drawings, a conventional tractor includes a frame 12 with a hood 14 pivotally attached to the frame 12. A grill 16 is typically movably attached to the front portion of the hood 14 as further shown in FIGS. 1 through 3 of the drawings. As can be appreciated, the tractor illustrated within the drawings is simply for illustration purposes and is not to be considered part of the present invention.

Figure 8:
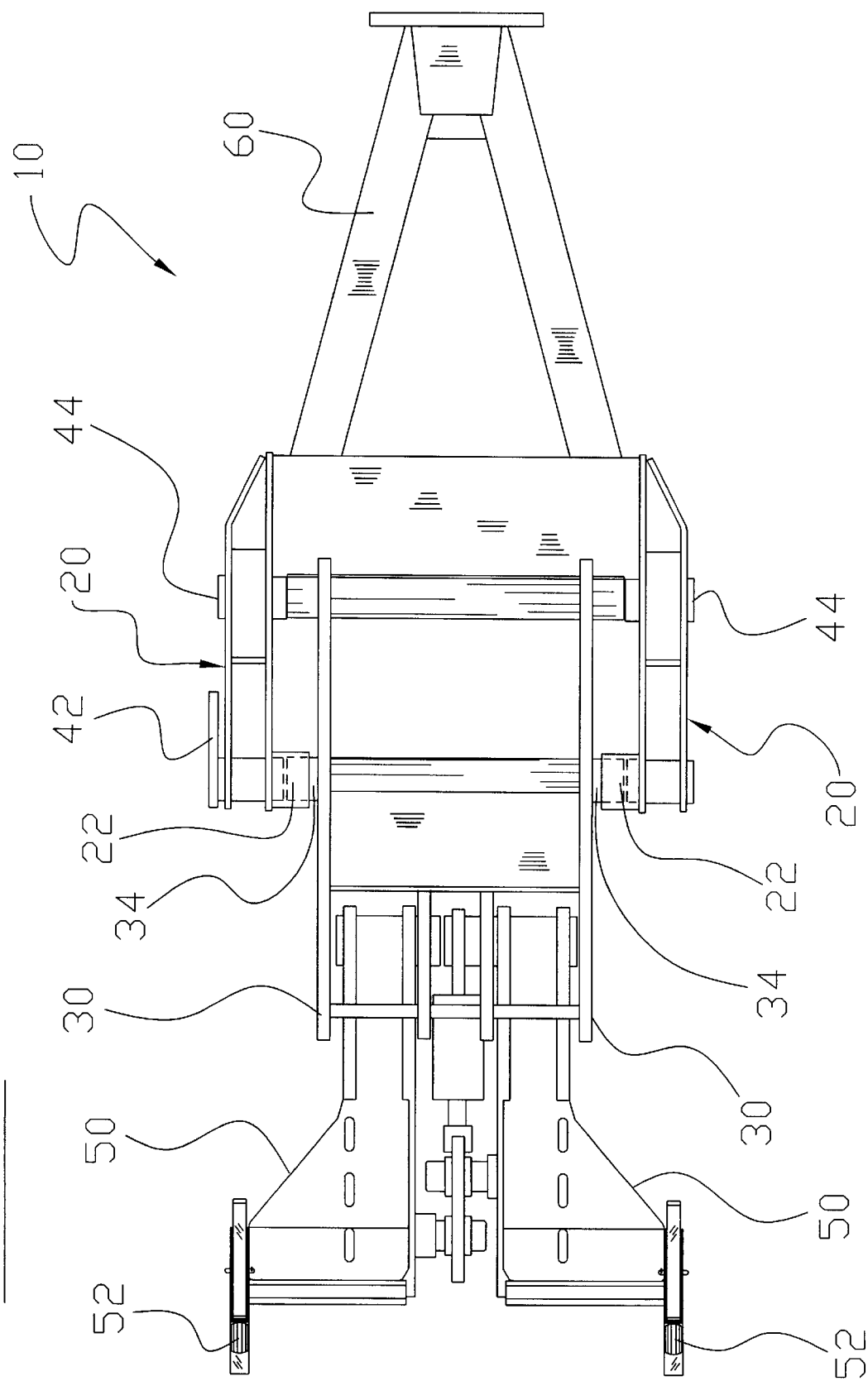
FIG. 8 is a top view of the present invention.
Figure 9:
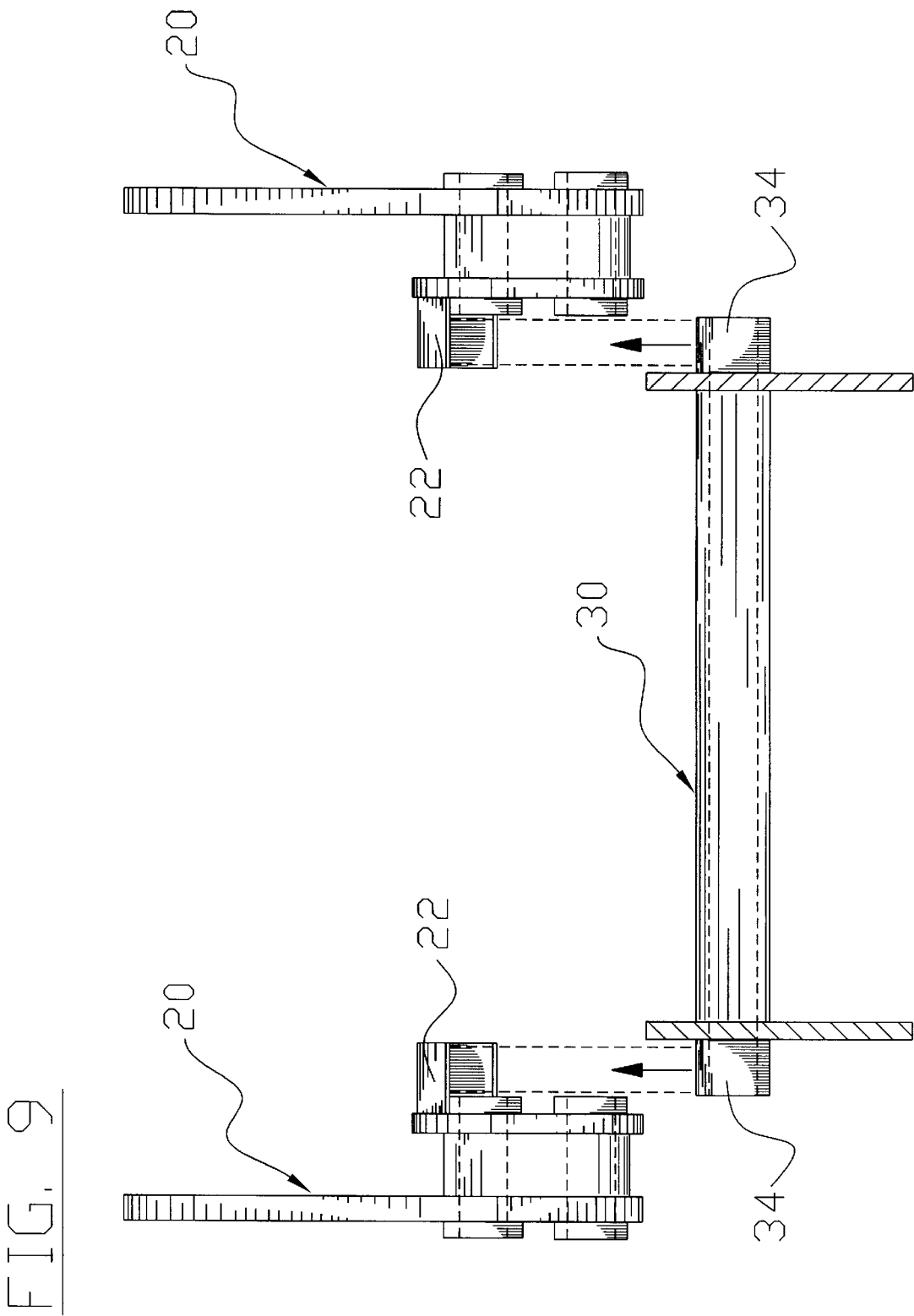
FIG. 9 is a cutaway front view of the present invention showing the movement of the extended tubular supports with respect to the cuff members.

As best shown in FIG. 8 of the drawings, a pair of support plates 20 are provided that are secured to the front side portions of the tractor frame 12 using conventional fasteners such as but not limited to nuts and bolts. A support frame 60 is preferably attached to the pair of opposing support plates 20 extending rearwardly attaching to the middle portion of the tractor frame 12 for providing added support to the support plates 20 thereby reducing the likelihood 14 of damage to the front portion of the tractor frame 12. It can be appreciated that the support plates 20 and the support frame 60 may be comprised of various shapes, designs and structures.

Figure 10:
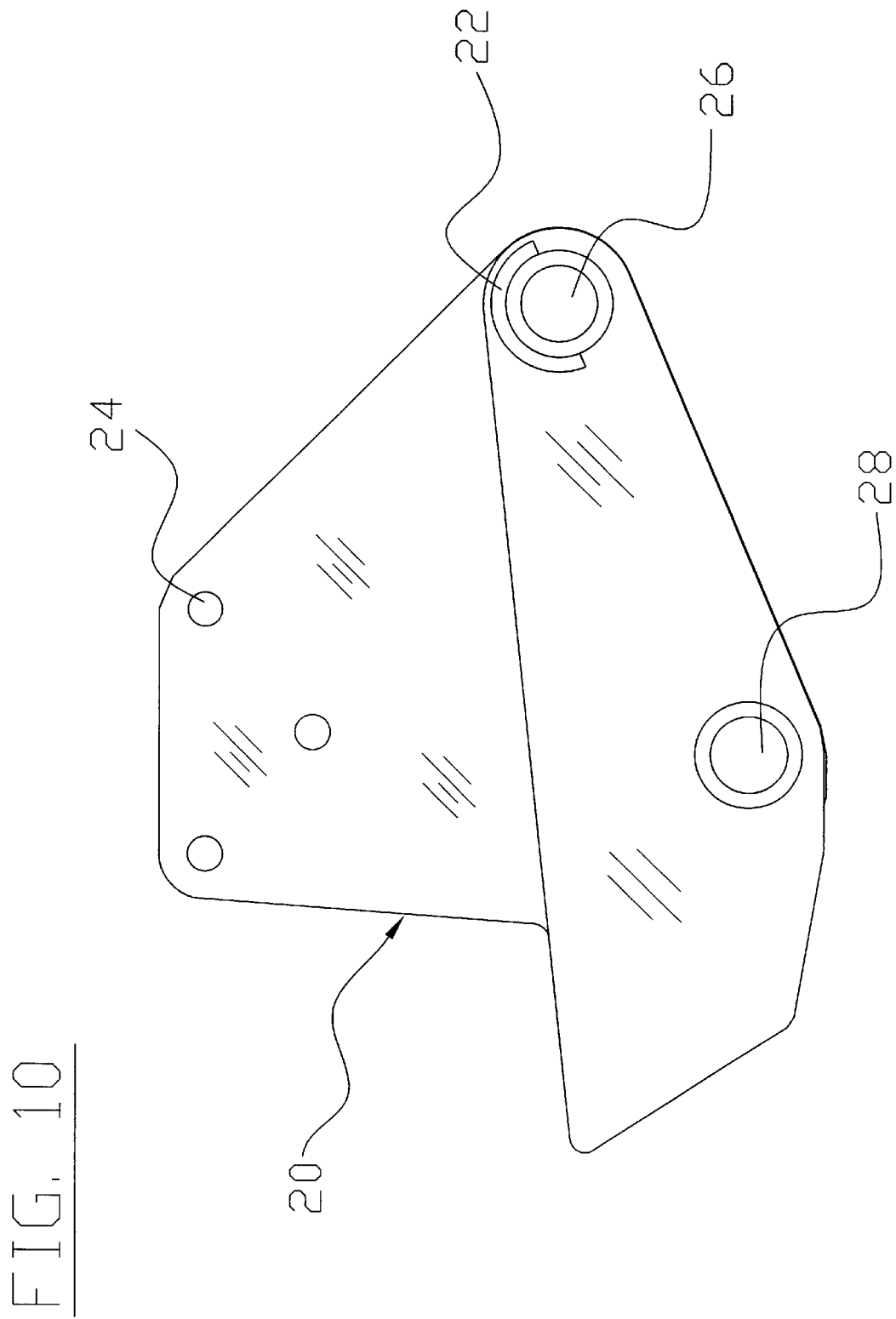
FIG. 10 is a magnified inner side view of the support plate.
Figure 11:
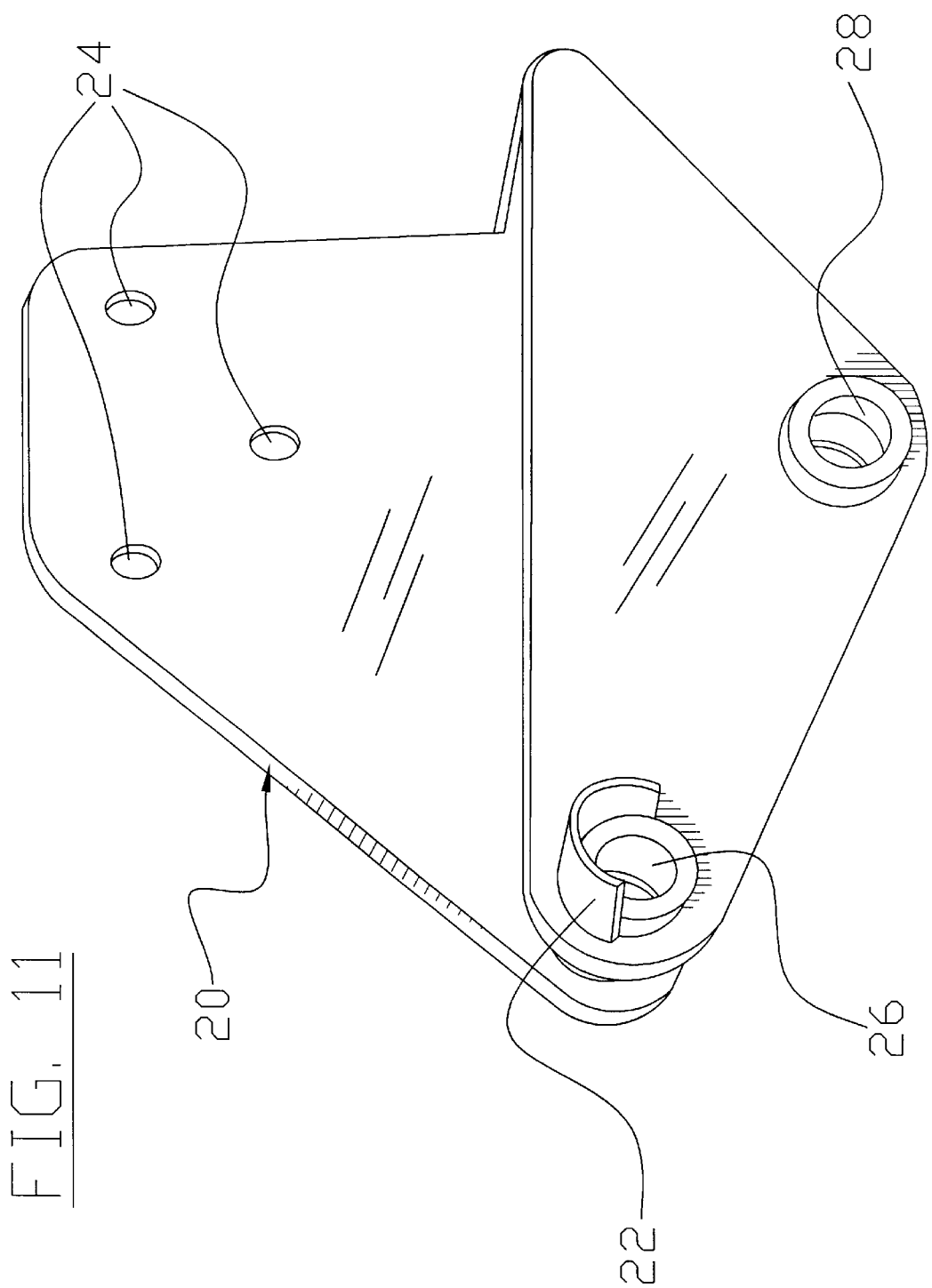
FIG. 11 is an inner upper side perspective view of the support plate showing the cuff member.
Figure 12:
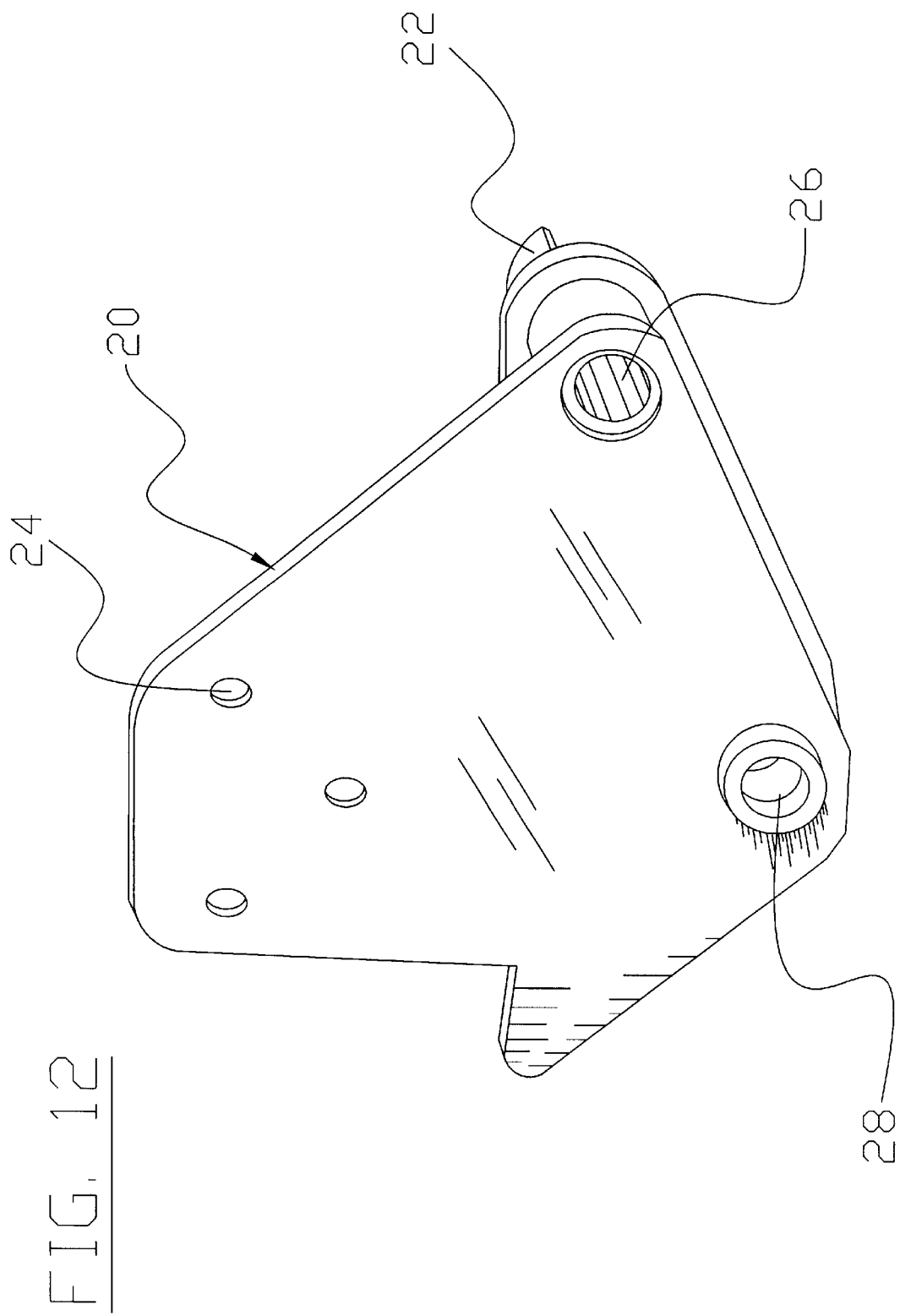
FIG. 12 is an outer upper side perspective view of the support plate showing the cuff member.

As shown in FIGS. 10 through 12 of the drawings, the support plates 20 each include a plurality of first apertures 24 that receive the conventional fasteners for attaching to the tractor frame 12. The support plates 20 each include a second aperture 26 toward a front portion of the support plates 20 for receiving a removably main pin 40 as further shown in FIGS. 6, 7, 10, 11, and 12.

As further shown in FIGS. 10 through 12 of the drawings, each of the support plates 20 includes a cuff member 22 extending inwardly and positioned about an upper portion of each second aperture 26. Each cuff member 22 is formed for removably receiving the extended tubular supports 34 extending from the support structure 30. Each second aperture 26 is preferably reinforced with conventional reinforcing structures such as but not limited to bushings. Each cuff member 22 has a C-shaped cross sectional shape with the open portion facing downwardly and forwardly.

As shown in FIGS. 10, 11, and 12, the support plates 20 each include a third aperture 28 positioned toward the rear portion of the support plates 20 for receiving a pivot pin 44 extending through the support structure 30. Each third aperture 28 is preferably reinforced with conventional reinforcing structures such as but not limited to bushings.

As shown in FIGS. 1 through 8 of the drawings, the support structure 30 is pivotally attached between the pair of support plates 20 with a pivot pin 44 inserted through the third apertures 28 within the support plates 20 and the support structure 30. The support structure 30 may be comprised of various shapes, structures and designs that are commonly utilized within conventional three-point hitches (both front and rear mounted). The support structure 30 preferably includes a vertical portions that extends upwardly for providing support to the hydraulic cylinders 32 that are connected between the support structure 30 and the support arms 50 as shown in FIGS. 1 through 7 of the drawings.

The support structure 30 further includes a fourth aperture 36 that corresponds with the second apertures 26 within the support plates 20. A pair of extended tubular supports 34 extend outwardly about the aperture from the support structure 30 as shown in FIGS. 1, 2, 6 and 7 of the drawings. The extended tubular supports 34 are formed to fit within the cuff members 22 so that the fourth aperture 36 within the support structure 30 is concentrically aligned with the second apertures 26 of the support plates 20 for receiving the main pin 40.

Figure 4:
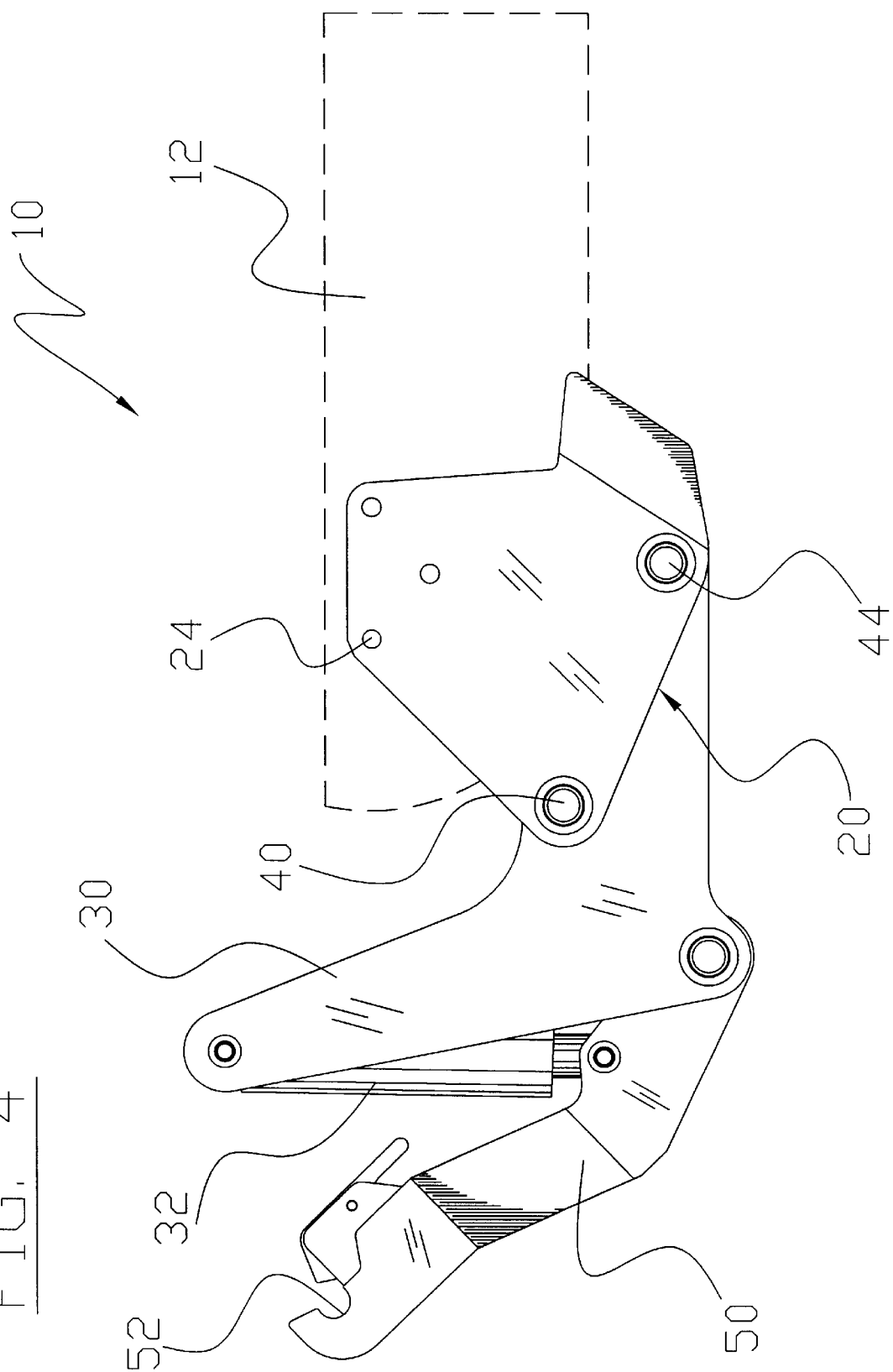
FIG. 4 is a side view of the present invention in the raised "transport" position.
Figure 5:
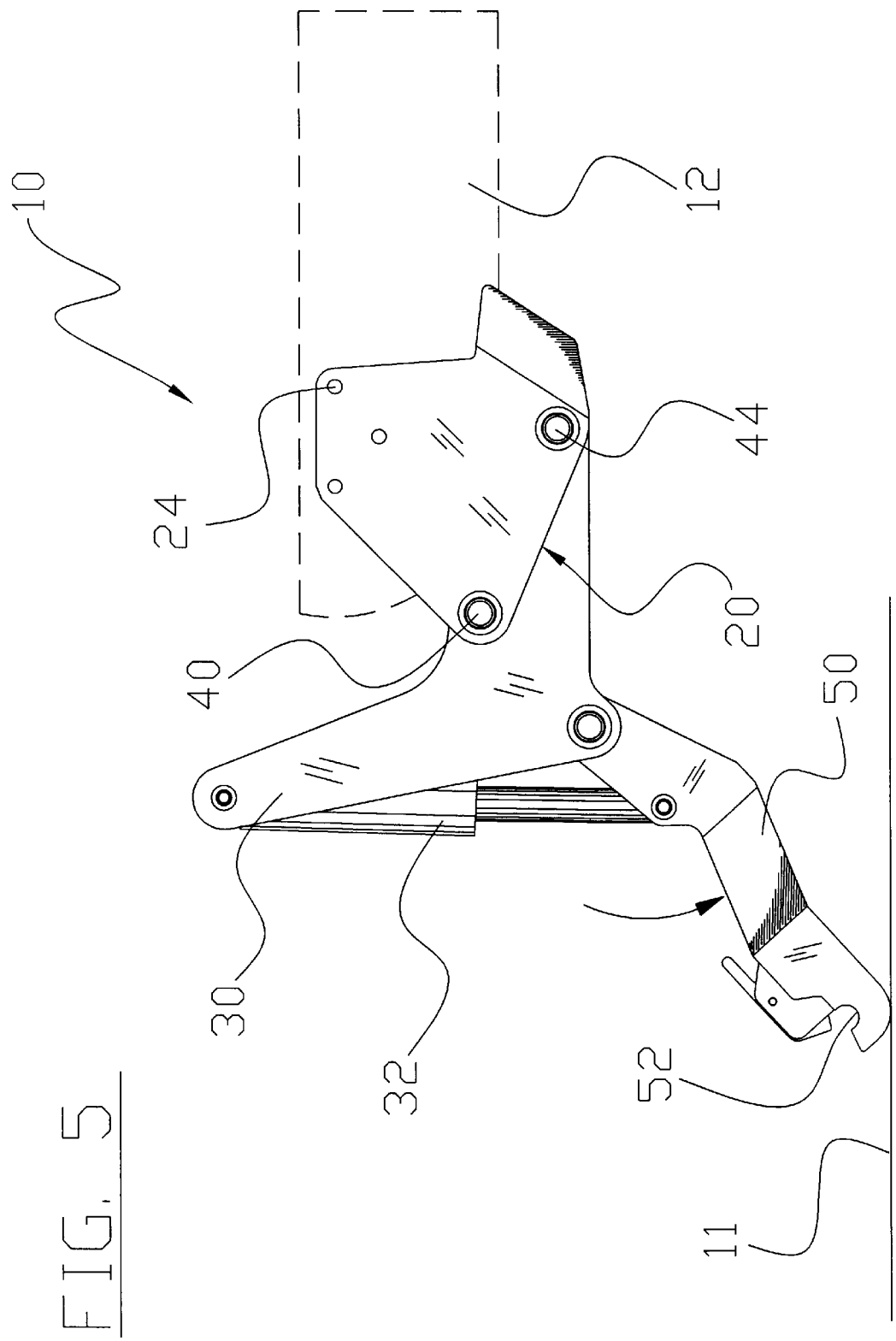
FIG. 5 is a side view of the present invention in a "lowered" position for releasing the pressure off the main pin.

A removable main pin 40 having a flanged end 42 is inserted through the extended tubular supports 34, the fourth aperture 36 and the second apertures 26 of the support plates 20 to retain the support structure 30 in an elevated position as shown in FIGS. 3 through 5 of the drawings. The main pin 40 may be secured in position within the fourth aperture 36 and the second apertures 26 with any well-known means.

As further shown in FIGS. 1 through 7 of the drawings, a pair of support arms 50 are pivotally attached to the support structure 30. The pair of hydraulic cylinders 32 are mechanically connected between the support structure 30 and the support arms 50 for elevating and lowering the support arms 50 with respect to the support structure 30. A pair of catch members 52 are positioned upon the distal ends of the support arms 50. The catch members 52 may be comprised of any well-known structure commonly utilized for three-point hitches.

Figure 6:
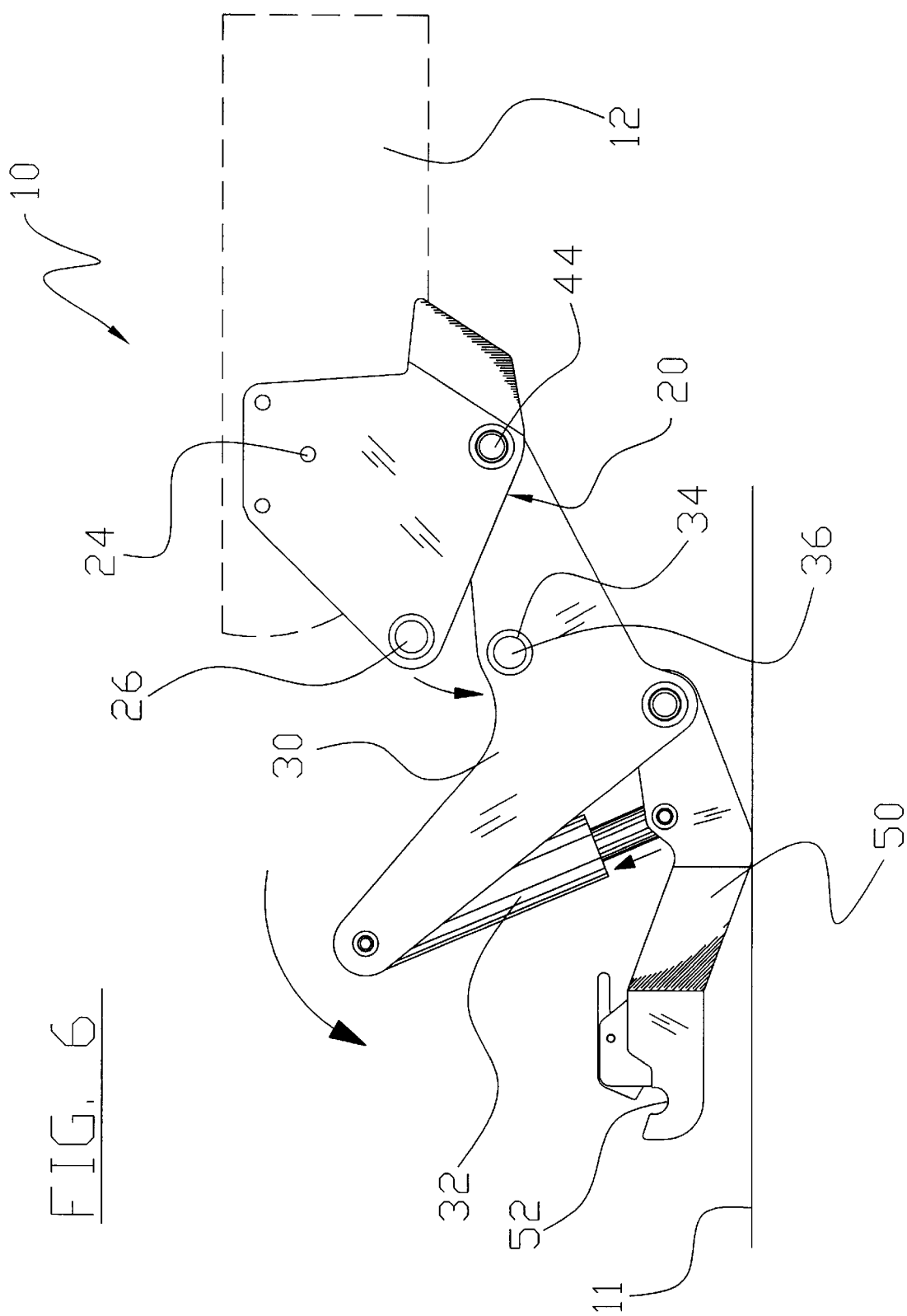
FIG. 6 is a side view of the present invention with the main pin removed and slightly lowered.
Figure 7:
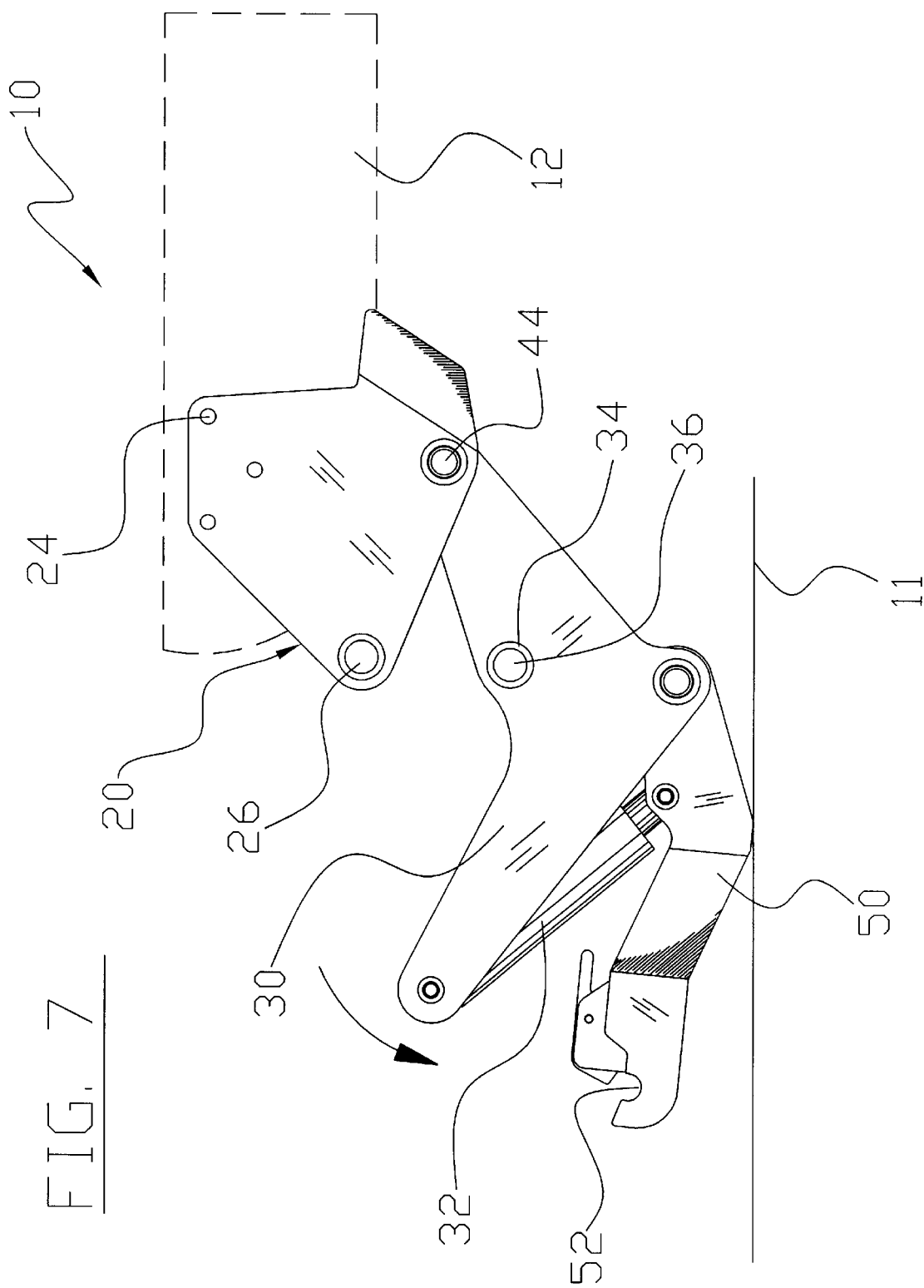
FIG. 7 is a side view of the present invention in the completely lowered position for allowing the hood and grill to be opened.

In use, if the user desires to open the hood 14 or grill 16 of the tractor the user lowers the support arms 50 until the distal portions of the support arms 50 are in engagement with the ground surface 11 as shown in FIG. 5 of the drawings. The user ensures that the hydraulic cylinders 32 are extended sufficiently to apply an upwardly force upon the support structure 30 thereby causing the extended tubular supports 34 to engage the upper inner surface of the cuff members 22 for removing the pressure off the main pin 40. Once the pressure is removed from the main pin 40, the user then removes the main pin 40 from the support structure 30 and the support plates 20. With the main pin 40 removed, the user then retracts the hydraulic cylinders 32 thereby causing the support structure 30 to pivot downwardly with respect to the support plates 20 and the tractor frame 12 as best shown in FIGS. 6 and 7 of the drawings. The user continues the retraction of the hydraulic cylinders 32 until the upper portion of the support structure 30 is positioned downwardly and forwardly enough to allow the hood 14 and grill 16 of the tractor to be fully opened as illustrated in FIG. 2 of the drawings. Once the user is finished examining the tractor, the user then closes the hood 14 and grill 16 of the tractor and thereafter performs the above actions in reverse. The user extends the hydraulic cylinders 32 so that the support structure 30 is pivoted upwardly until the extended tubular supports 34 engage the upper inner surface of the cuff members 22. The user then inserts the main pin 40 through the second apertures 26 within the support plates 20 and the fourth aperture 36 within the support structure 30 thereby retaining the support structure 30 in the desired position. The user then elevates the support arms 50 by retracting the hydraulic cylinders 32 to the desired position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A front three-point hitch system, comprising:
   a support frame attachable to a tractor frame;
   a support structure pivotally attached to said support frame;
   a pair of support arms pivotally attached to said support structure;
   an actuator means connected between said support structure and said pair of support arms for elevating and lowering said pair of support arms;
   a first aperture and a second aperture extending through said support frame and aligned with one another;
   a main pin positionable through said first aperture and said second aperture;
   a pair of extended tubular supports extending about said second aperture and from said support structure; and
   a pair of cuff members extending about said first aperture and from said support frame, wherein said pair of cuff members are formed for receiving said pair of extended tubular supports.

2. The front three-point hitch system of claim 1, wherein said actuator means is comprised of at least one hydraulic cylinder.

3. The front three-point hitch system of claim 1, wherein said pair of cuff members have a C-shaped cross sectional shape, wherein an open portion of said pair of cuff members face substantially downwardly.

4. The front three-point hitch system of claim 1, wherein an interior diameter of said cuff members is approximately equal to an exterior diameter of said extended tubular supports.

5. The front three-point hitch system of claim 1, wherein said cuff members receive said extended tubular supports so that a lumen of said second aperture is concentric with said first aperture.

6. The front three-point hitch system of claim 1, wherein said actuator means is comprised of at least two hydraulic cylinders.

7. The front three-point hitch system of claim 1, wherein said support frame is comprised of a pair of support plates.

8. A front three-point hitch system, comprising:
   a support frame comprised of a pair of support plates attachable to a tractor frame;
   a support structure pivotally attached to said support frame;
   a pair of support arms pivotally attached to said support structure;
   an actuator means connected between said support structure and said pair of support arms for elevating and lowering said pair of support arms;
   a first aperture extending through each of said pair of support plates;
   a second aperture extending through said support structure alignable with said first aperture;
   a main pin positionable through said first aperture and said second aperture;
   a pair of extended tubular supports extending about said second aperture and from said support structure; and
   a pair of cuff members extending about said first aperture and from each of said support plates, wherein said pair of cuff members are formed for receiving said pair of extended tubular supports.

9. The front three-point hitch system of claim 8, wherein said pair of cuff members have a C-shaped cross sectional shape, wherein an open portion of said pair of cuff members face substantially downwardly.

10. The front three-point hitch system of claim 8, wherein an interior diameter of said cuff members is approximately equal to an exterior diameter of said extended tubular supports.

11. The front three-point hitch system of claim 8, wherein said cuff members receive said extended tubular supports so that a lumen of said second aperture is concentric with said first aperture.

12. The front three-point hitch system of claim 8, wherein said actuator means is comprised of at least two hydraulic cylinders.

13. A method of utilizing a front three-point hitch system having a support frame attachable to a tractor frame, a support structure pivotally attached to said support frame, a pair of support arms pivotally attached to said support structure, an actuator means connected between said support structure and said pair of support arms for elevating and lowering said pair of support arms, and a main pin for securing said support structure to said support frame, wherein said method comprises the steps of:
   (a) extending said actuator means thereby lowering said pair of support arms until a distal portion thereof engages a ground surface thereby removing a weight of said support structure from said main pin;
   (b) removing said main pin; and
   (c) retracting said actuator means thereby lowering said support structure with respect to said support frame.

14. A method of utilizing a front three-point hitch system having a support frame attachable to a tractor frame, a pair of cuff members extending inwardly from said support frame, a support structure pivotally attached to said support frame, a pair of extended tubular supports extending outwardly from said support structure that are aligned and receivable with said pair of cuff members, a pair of support arms pivotally attached to said support structure, an actuator means connected between said support structure and said pair of support arms for elevating and lowering said pair of support arms, and a main pin for securing said support structure to said support frame, wherein said method comprises the steps of:

(a) extending said actuator means thereby lowering said pair of support arms until a distal portion thereof engages a ground surface forcing said extended tubular supports against said pair of cuff members thereby removing a weight of said support structure from said main pin;

(b) removing said main pin; and (c) retracting said actuator means thereby lowering said support structure with respect to said support frame.

* * * * *